Figure 1:
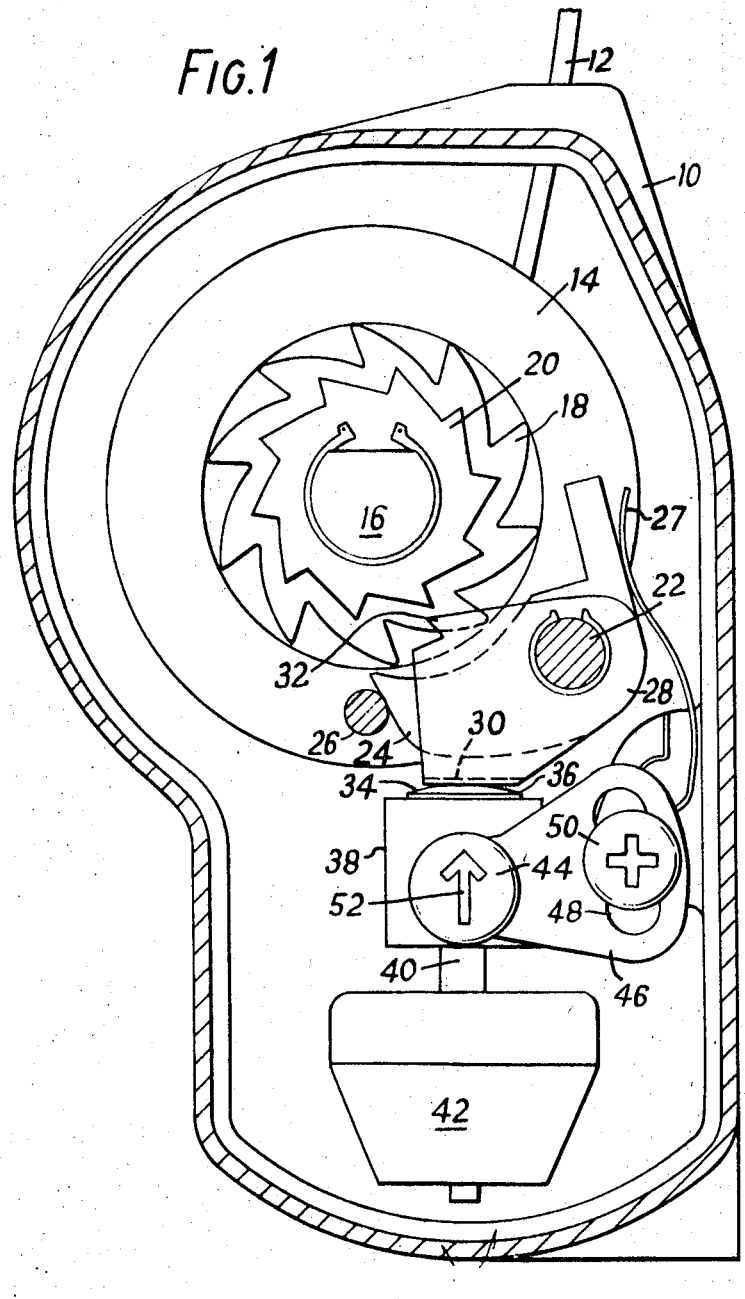

United States Patent

[11] 3,578,260

| | | | |
|---|---|---|---|
| [72] | Inventor | John Kell | |
| | | Carlisle, Cumberland, England | |
| [21] | Appl. No. | 836,502 | |
| [22] | Filed | June 25, 1969 | |
| [45] | Patented | May 11, 1971 | |
| [73] | Assignee | Kangel Magnet Limited | |
| | | London, England | |
| [32] | Priority | June 27, 1968 | |
| [33] | | Great Britain | |
| [31] | | 30,816/68 | |

[54] INERTIA REEL MECHANISMS
8 Claims, 2 Drawing Figs.

[52] U.S. Cl. .................................................. 242/107.4
[51] Int. Cl. ...................................................... B65h 75/48
[50] Field of Search ............................................. 242/107,
107 (SB), 107.4, 107.6, 107.7; 297/388; 280/150 (SB)

[56] References Cited
UNITED STATES PATENTS

| | | | |
|---|---|---|---|
| 3,226,053 | 12/1965 | Petty ............................ | 242/107.4 |
| 3,343,765 | 9/1967 | Baker ........................... | 242/107.4 |
| 3,430,891 | 3/1969 | Burleigh ....................... | 242/107.4 |
| 3,489,367 | 1/1970 | Kovacs et al. ................. | 242/107.4 |
| 3,495,786 | 2/1970 | Hemens ........................ | 242/107.4 |

*Primary Examiner*—Stanley N. Gilreath
*Assistant Examiner*—Werner H. Schroeder
*Attorney*—Young and Thompson ABSTRACT: In a vehicle-sensitive inertia reel device of the pendulum type, the pendulum is arranged to cause a subsidiary pawl to move from a first position in which it does not engage with a subsidiary ratchet wheel mounted on the reel to a second position in which it does so engage, rotation of the reel in the direction resisted by the main pawl when the subsidiary pawl is in its second position being operative to move the subsidiary pawl from its second position to a third position and movement of the subsidiary pawl from its second position to its third position being arranged to cause the main pawl to move from a first position in which it engages in one direction and a second position in which it does not so engage.

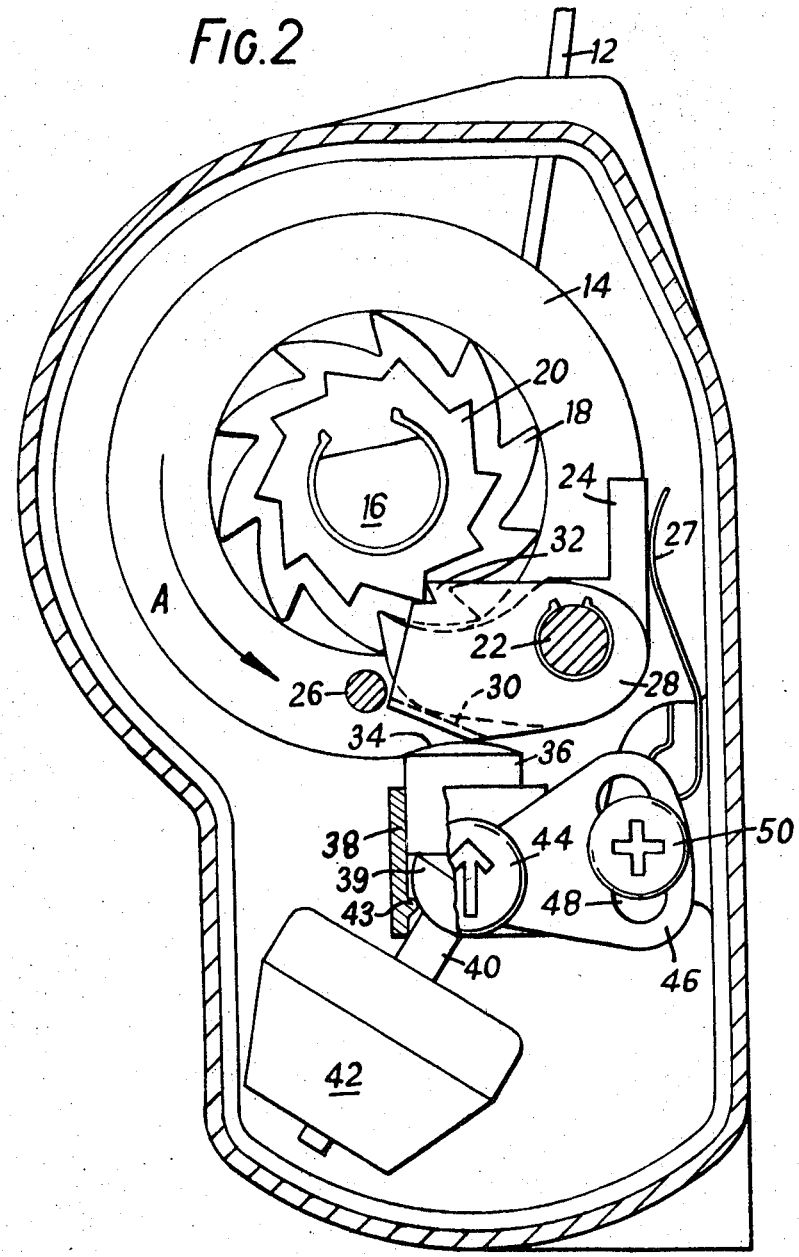

INERTIA REEL MECHANISMS

This invention relates to a mechanism for utilizing energy derived from a rotating shaft for moving a pawl into engagement with a ratchet wheel on such shaft. The invention is applicable to inertia reel mechanisms for use with vehicle safety belts and more particularly to an inertia reel mechanism which is vehicle sensitive, that is to say, one which is locked in response to acceleration of the vehicle.

It should be understood that the word "acceleration" is used herein to include the effect produced by cornering and braking.

An inertia reel of this type is disclosed in our copending application No. 713,804 now U.S. Pat. No. 3,508,720. This application discloses a reel in which deflection of a pendulum is arranged to lift a pawl into engagement with a ratchet wheel mounted on the reel spindle. The energy for lifting the pawl is provided by the momentum of the pendulum. The pawl is biased for outward engagement with the ratchet wheel by a spring which must be relatively weak if the pendulum is not to be unduly massive. According to the invention, an inertia reel device comprises a reel having a main ratchet wheel and a subsidiary ratchet wheel mounted for rotation therewith, a main pawl movable between a first position in which it engages with the main ratchet wheel to resist rotation thereof in one direction and a second position in which it does not so engage and a subsidiary pawl movable, by means of an inertia-sensing device, from a first position in which it does not engage with the subsidiary ratchet wheel to a second position in which it does so engage, rotation of the reel in the direction resisted by the main pawl when the subsidiary pawl is in its second position being operative to move the subsidiary pawl from its second position to a third position and movement of the subsidiary pawl from its second position to its third position being arranged to cause the main pawl to move from its first position to its second position.

The invention will be more readily understood from the following detailed description of an application thereof to a vehicle-sensitive inertia reel with reference to the accompanying drawings, in which:

FIG. 1 is a sectional view of an embodiment of the invention showing the pawl in the disengaged position, and FIG. 2 is a sectional view similar to FIG. 1 but with the pawl in the engaged position and the pendulum support partially broken away.

Referring to FIG. 1, an inertia reel mechanism is mounted in a housing 10. A strap 12 is led through a slot in the housing 10 and onto a reel 14, which is mounted on a shaft 16. Also mounted on the shaft 16 and secured to the reel 14 for rotation therewith are a main ratchet wheel 18 and a subsidiary ratchet wheel 20 of somewhat smaller diameter than the main ratchet wheel 18.

Also located within a housing is a pivot pin 22 on which is mounted a pawl 24. The pawl 24 is biased into contact with a stop 26 by means of a leaf spring 27, the pawl 24 being movable against the action of the spring 27 into engagement with the main ratchet wheel 18.

A pawl catch plate 28 is also pivotally mounted on the pin 22. The catch plate 28 has a horizontally protruding lip 30 on its lower edge and a pawl tooth 32 at its upper corner. If the catch plate 28 is rotated in a clockwise direction as seen in FIG. 1, the lip 30 engages with the bottom of the pawl 24 and the pawl tooth 32 is moved into a position such that it can engage with the subsidiary ratchet wheel 20.

The bottom of the catch plate 28 rests on the domed top 34 of a cylindrical member 36 which is slidably disposed in a cylindrical socket 38; the bottom of the cylindrical member 36 rests on the flat surface of a hemisphere 39 which is secured to the shaft 40 of a pendulum 42. The hemisphere on the shaft 40 rests in a socket formed by a reduced diameter portion 43 of the socket 38 so that, if the pendulum is deflected from the axis of the cylindrical member 36, the latter is lifted in the socket 38. This arrangement is described and illustrated more fully in the above mentioned copending application.

Referring now to FIG. 2, if the housing 10 is accelerated in the left to right direction, the pendulum 42 will be deflected as shown. Deflection of the pendulum 42 will cause the cylindrical member 36 to lift the catch plate 28 until the lip 30 thereon comes into contact with the bottom edge of the pawl 24. Normally, insufficient force will be produced by the pendulum 42 to move the pawl 24 against the action of the spring 27. However, under these conditions the pawl tooth 32 of the catch plate 28 is in a position such that it can engage with the subsidiary ratchet wheel 20. If tension is applied to the strip 12, the reel 14 will tend to rotate in the direction shown by the arrow A. Almost immediately, one of the teeth of the subsidiary ratchet wheel 20 engages with the ratchet tooth 32 of the catch plate 29. Further unwinding of the strap 12 from the reel 14 will cause the lip 30 of the catch plate 28 to lift the pawl 24 into engagement with the main ratchet wheel 18 and thereafter, further rotation of the reel 14 is prevented. It should be understood that the length of the pawl 24 is so related to the distance of the pawl tooth 32 from the pivot 22 that, when the pawl 24 is in engagement with the ratchet wheel 18, it takes the thrust which prevents further rotation of the wheel 14, none of this thrust being taken by the catch plate 32.

When the acceleration ceases, the pendulum 42 returns to the vertical position. However, the shape of the teeth of the main ratchet wheel 18 is such that the pawl 42 is maintained in engagement therewith until such time as the tension is removed from the strap 12.

The socket 38 which supports the pendulum 42 is mounted on a rotatable shaft 44. A lever 46 having an arcuate slot 48 is secured to the shaft 44 so that the latter can be prevented from rotating by means of a clamping screw 50, which projects through the slot 48. Rotation of the shaft 44 permits the orientation of the axis of the cylinder 36 to be adjusted so that it is vertical. An arrow-shaped slot 52 in the end of the shaft 44 both provides an indication of the orientation of the axis of the cylinder 46 and allows the use of a screwdriver to make the necessary adjustment.

The invention accordingly provides means whereby energy from a rotating shaft may be used to move a pawl into engagement with a ratchet wheel on such shaft, the mechanism being actuated by a considerably smaller force that is necessary to move the pawl. Its application is not limited to pendulum-actuated mechanisms.

I claim:

1. An inertia reel device comprising a reel, a main ratchet wheel mounted for rotation with the reel, a subsidiary ratchet wheel mounted for rotation with the reel, a main pawl movable between a first position in which it does not engage with the main ratchet wheel to resist rotation thereof in one direction and a second position in which it does so engage, a subsidiary pawl movable from a first position in which it does not engage with the subsidiary ratchet wheel to a second position in which it does so engage, and an inertia-sensing device operative when subject to acceleration to move the subsidiary pawl from its first position to its second position, rotation of the reel in the direction resistable by the main pawl when the subsidiary pawl is in its second position being operative to move the subsidiary pawl from its second position to a third position and movement of the subsidiary pawl from its second position to its third position being operative to cause the main pawl to move from its first position to its second position.

2. An inertia reel device as claimed in claim 1, in which the main pawl is spring biased into its first position.

3. An inertia reel device as claimed in claim 1, in which the subsidiary pawl is provided with a lip arranged to engage with the main pawl.

4. An inertia reel device as claimed in claim 1, in which the inertia-sensing device comprises a pendulum and means, responsive to displacement of the pendulum from the vertical, to cause movement of the subsidiary pawl from its first position to its second position.

5. An inertia reel device as claimed in claim 4, in which the means responsive to displacement of the pendulum from the vertical comprises a hemispherical operating member secured to the upper end of the pendulum with its plain surface uppermost, a socket, the pendulum being supported by engagement of said hemispherical operating member in said socket so that the pendulum can rotate through a limited angle in all directions about the center of curvature of the hemisphere, and a vertically reciprocable plunger supported on the plane surface of the hemisphere and having the subsidiary pawl resting thereon, whereby the displacement of the pendulum from the vertical causes the operating member to lift the plunger so that the subsidiary pawl moves from its first position to its second position.

6. A device as claimed in claim 5, in which the socket supporting the hemispherical operating member is pivotally mounted for rotation about a horizontal axis and is lockable in a desired position.

7. A device as claimed in claim 6, including an indicating member for providing an indication of the orientation of the socket.

8. A device as claimed in claim 1, in which the teeth of the ratchet wheel are so shaped that, if the pawl is moved into engagement therewith and a torque is applied to the reel in a direction such that the pawl inhibits rotation, the pawl is retained in engagement until such torque is removed.